US012761650B2

(12) United States Patent
Kellari

(10) Patent No.: US 12,761,650 B2
(45) Date of Patent: Oct. 13, 2026

(54) VIRTUAL BARRIERS FOR RESERVED CORRIDORS

(71) Applicant: Cavnue Technology, LLC, Arlington, VA (US)

(72) Inventor: Demetrios Vasili Kellari, Brooklyn, NY (US)

(73) Assignee: Cavnue Technology, LLC, Arlington, VA (US)

( * ) Notice: Subject to any disclaimer, the term of this patent is extended or adjusted under 35 U.S.C. 154(b) by 172 days.

(21) Appl. No.: 18/159,771

(22) Filed: Jan. 26, 2023

(65) Prior Publication Data

US 2023/0280751 A1 Sep. 7, 2023

Related U.S. Application Data

(60) Provisional application No. 63/304,197, filed on Jan. 28, 2022, provisional application No. 63/304,191, filed on Jan. 28, 2022.

(51) Int. Cl.
*G05D 1/00* (2024.01)

(52) U.S. Cl.
CPC ......... *G05D 1/0214* (2013.01); *G05D 1/0088* (2013.01)

(58) Field of Classification Search
CPC ........... B60W 30/18163; B60W 50/14; B60W 2420/403; B60W 30/12; B60W 2556/50; B60W 2552/53; B60W 2554/80; B60W 30/09; B60W 30/10; B60W 30/0956; B60W 30/085; G06V 20/588; G06V 20/58; G06V 20/597; B62D 15/025; B62D 15/0255; B62D 15/0265; B62D 6/00; B62D 15/029; G05D 1/0088; G05D 1/0212;
(Continued)

(56) References Cited

U.S. PATENT DOCUMENTS 8,812,193 B2 * 8/2014 Luke ................ B60W 30/0956 701/41
10,223,912 B1 * 3/2019 Agarwal ................ G08G 1/091
2016/0307441 A1 10/2016 Wieskamp et al.
(Continued)

FOREIGN PATENT DOCUMENTS

CN 111409649 A 7/2020

OTHER PUBLICATIONS

U.S. Appl. No. 17/210,099, filed Mar. 23, 2021, Clifford.
(Continued)

*Primary Examiner* — Khoi H Tran
(74) *Attorney, Agent, or Firm* — Fish & Richardson P.C.

(57) ABSTRACT

Methods, systems, and apparatus, including computer programs encoded on computer storage media, for sending data indicating a plurality of virtual barriers to an agent traveling on a roadway, wherein the plurality of virtual barriers separate the roadway into a first corridor of the roadway and a second corridor of the roadway, obtaining sensor data captured by one or more sensors installed on the roadway, wherein the sensor data characterizes a state of the agent traveling on the roadway, predicting, from the sensor data, lateral movement of the agent from the first corridor of the roadway towards the second corridor of the roadway, and sending a signal based on the lateral movement.

20 Claims, 3 Drawing Sheets

(58) Field of Classification Search
CPC .............. G05D 1/0214; G01C 21/3415; G01C 21/3658; G01C 21/26; G01C 21/3492; G01C 21/34
USPC ...................................................... 701/23, 41
See application file for complete search history.

(56) References Cited

U.S. PATENT DOCUMENTS

| | | | | |
|---|---|---|---|---|
| 2019/0286160 A1* | 9/2019 | Toda | G05D 1/0214 | |
| 2023/0092432 A1* | 3/2023 | Clifford | G08G 1/015 | 701/117 |
| 2023/0154320 A1* | 5/2023 | Sasatani | B60W 60/0011 | 701/26 |
| 2023/0237900 A1* | 7/2023 | Kellari | G08G 1/04 | 701/117 |
| 2024/0217581 A1* | 7/2024 | Peswani | B62D 6/00 | |
| 2025/0155261 A1* | 5/2025 | Steurer | G08G 1/04 | |

OTHER PUBLICATIONS

U.S. Appl. No. 17/476,800, filed Sep. 16, 2021, Clifford et al.
International Search Report and Written Opinion in International Appln. No. PCT/US2023/011672, mailed on Apr. 26, 2023, 13 pages.
International Preliminary Report on Patentability in International Appln. No. PCT/US2023/011672, mailed on Aug. 8, 2024, 8 pages.

* cited by examiner

VIRTUAL BARRIERS FOR RESERVED CORRIDORS

CROSS-REFERENCE TO RELATED APPLICATION

This application claims the benefit of commonly assigned U.S. Prov. App. Nos. 63/304,191, filed Jan. 28, 2022, and 63/304,197, filed Jan. 28, 2022, the contents of each are incorporated by reference herein in their entireties.

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this specification relates to predicting and responding to lateral movement of an agent (e.g., a vehicle, a pedestrian, a cyclist) traveling on a roadway that is equipped with virtual barriers for a reserved corridor.

In some implementations, actions include sending data indicating a plurality of virtual barriers to an agent traveling on a roadway, wherein the plurality of virtual barriers separate the roadway into a first corridor of the roadway and a second corridor of the roadway, obtaining sensor data captured by one or more sensors installed on the roadway, wherein the sensor data characterizes a state of the agent traveling on the roadway, predicting, from the sensor data, lateral movement of the agent from the first corridor of the roadway towards the second corridor of the roadway, and sending a signal based on the lateral movement. Other implementations of this aspect include corresponding systems, apparatus, and computer programs, configured to perform the actions of the methods, encoded on computer storage devices.

These and other implementations can each optionally include one or more of the following features: the first corridor and the second corridor are separated by the plurality of virtual barriers that do not physically exist, wherein vehicles on the roadway are not allowed to move between the first corridor and the second corridor; the lateral movement of the agent includes at least one of merging, weaving, and cutting-in movements of the agent; the agent is a vehicle traveling on the roadway; the agent is one of an autonomous vehicle and a semi-autonomous vehicle, and predicting, from the sensor data, the lateral movement of the agent from the first corridor of the roadway towards the second corridor of the roadway includes predicting, from the sensor data, that the agent is going to move from a reserved corridor for autonomous or semi-autonomous vehicles towards a general-purpose lane; the agent is a vehicle operated by a human driver, and predicting, from the sensor data, the lateral movement of the agent from the first corridor of the roadway towards the second corridor of the roadway includes predicting, from the sensor data, that the agent is going to move from a general-purpose lane towards a reserved corridor for autonomous or semi-autonomous vehicles; sending the signal based on the lateral movement includes sending the signal of the lateral movement to the agent to prevent the agent from moving to the second corridor of the roadway; sending the signal based on the lateral movement includes sending the signal to a display device installed on the roadway, and displaying the signal to the agent to prevent the agent from moving to the second corridor of the roadway; sending the signal based on the lateral movement includes sending the signal of the lateral movement to a control system of the roadway; sending the signal based on the lateral movement includes sending the signal of the lateral movement to another agent traveling on the roadway; and the roadway includes a buffer zone between the first corridor and the second corridor.

The subject matter described in this specification can be realized in various implementations and may result in one or more of the following advantages. The systems and methods can use sensor data to predict lateral movement of an agent that travels between a reserved corridor and a general-purpose lane on a roadway. The systems and methods can send a signal to one or more agents on the roadway, a control center, or both, to prevent an on-going lateral movement, reduce future lateral movements, or both. Thus, the systems and methods can improve the safety and usage efficiency of a roadway with virtual barriers. The systems and techniques can configure the operating environment (e.g., enabling automated vehicle operations) without the need to deploy costly physical infrastructure (e.g., physical barriers). The systems and techniques can improve road congestion by enabling coordination of driving in one or more dedicated lanes and preventing the propagation of stop waves due to vehicle cut-ins and cut-outs.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
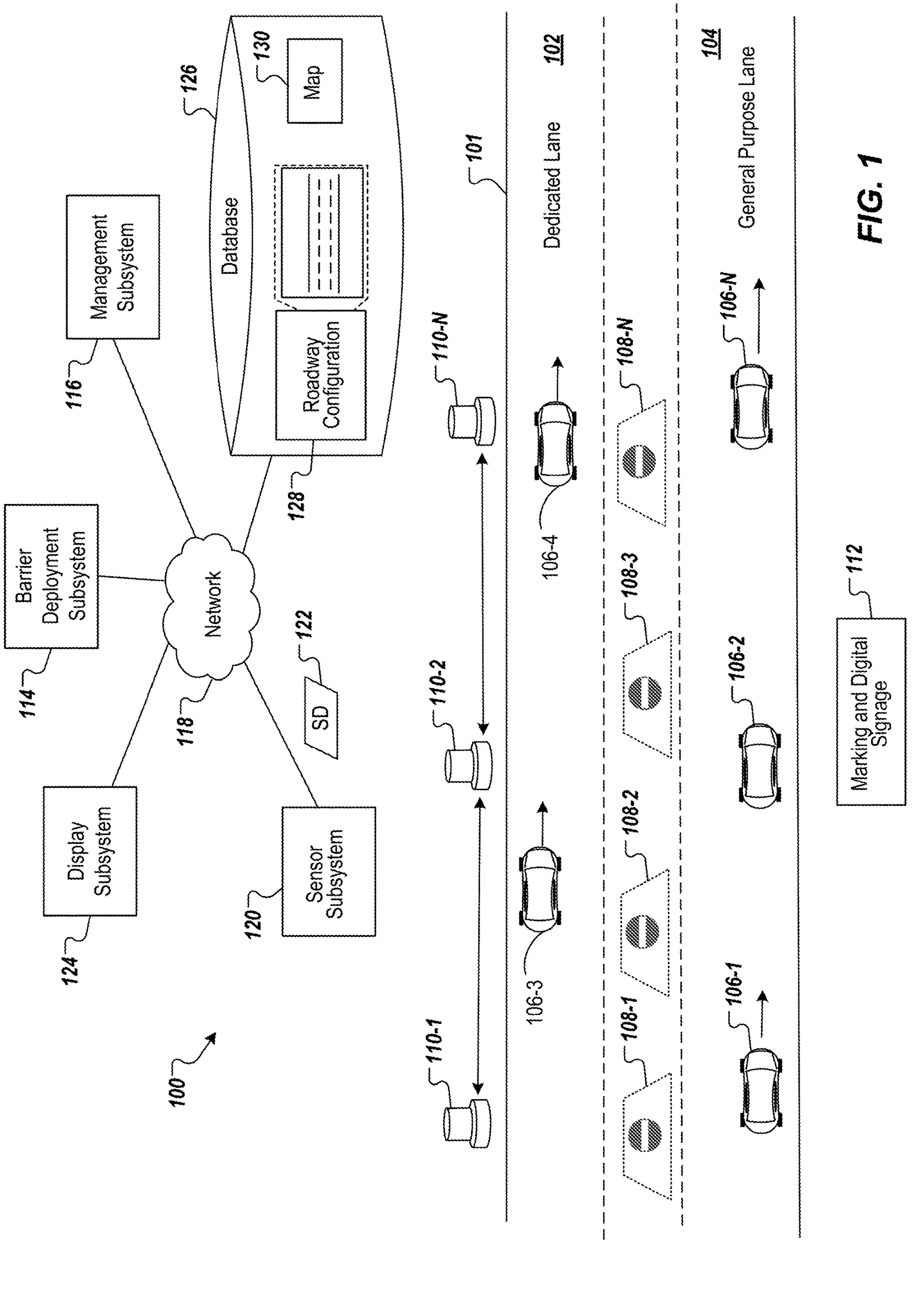
FIG. 1 is a block diagram that illustrates an example of a system that includes virtual barriers for a reserved corridor.

Implementations of the present disclosure are directed to predicting and responding to lateral movement of an agent (e.g., a vehicle, a pedestrian, a cyclist) traveling on a roadway that is equipped with virtual barriers for a reserved corridor. In some implementations, actions include sending data indicating a plurality of virtual barriers to an agent traveling on a roadway, wherein the plurality of virtual barriers separate the roadway into a first corridor of the roadway and a second corridor of the roadway, obtaining sensor data captured by one or more sensors installed on the roadway, wherein the sensor data characterizes a state of the agent traveling on the roadway, predicting, from the sensor data, lateral movement of the agent from the first corridor of the roadway towards the second corridor of the roadway, and sending a signal based on the lateral movement.

To provide context for implementations of the present disclosure, to increase safety and throughput, a roadway can include a reserved corridor (e.g., one or more dedicated lanes) dedicated for particular types of agents (e.g., autonomous vehicles, semi-autonomous vehicles, buses, etc.) during a specified period of time. The reserved corridor can be created by deploying physical barriers on the roadway that can separate the reserved corridor from other lanes (e.g., other general-purpose lanes that all types of vehicles can use). One of the challenges of creating the reserved corridor is to safely and efficiently deploy and remove physical road barriers on the roadway without significant impact to traffic. For example, safely deploying and removing physical road barriers at a high speed can be challenging and expensive. Instead of physical road barriers, the subject matter of this specification relates to using virtual barriers to create a reserved corridor for particular types of agents. In an environment where the physical space is limited (e.g., an urban environment), there may not be enough space to install the physical road barriers on a roadway.

The subject matter of the specification can be performed by a computer system that includes one or more computers as part of a roadway infrastructure. The computer system can be implemented in an edge device located on the side of a roadway, and/or can be located at a remote server system that communicates with an edge device on a roadway using a network. The computer system can implement a method for predicting lateral movement of one or more agents traveling on the roadway, classifying anomalous agents (e.g., disengaged, erratic), preventing and reducing lateral movements of the one or more agents, and therefore, ensuring the safety and effectiveness of virtual barriers that are used to create the reserved corridor.

The system can send data indicating the virtual barriers to vehicles on the roadway (e.g., both autonomous or semi-autonomous vehicles and non-autonomous vehicles operated by human drivers). That is, the system can create the reserved corridor for the autonomous vehicles by sending data indicating a presence and location of respective virtual barriers relative to vehicles on the roadway. After receiving data indicating the virtual barriers, ideally, the vehicles on the roadway should not cross the virtual barriers as if the virtual barriers are physical road barriers. For example, an autonomous vehicle can save the data indicating the virtual barriers in the on-board system of the autonomous vehicle (e.g., storing the data indicating the virtual barriers in the on-board high-definition maps or incorporating the data into the on-board path/route planning system). The autonomous vehicle should perceive the virtual barriers as virtual objects that the autonomous vehicle is not allowed to cross. However, disengagement of autonomous vehicles or human drivers who operate non-autonomous or semi-autonomous vehicles may forget or ignore the virtual barriers. Vehicles may make lateral movements across the virtual barriers, which may slow down the traffic or even cause safety issues.

The subject matter of this specification relates to systems and methods to use virtual barriers to create a reserved corridor for particular types of agents and, in particular, to prevent and reduce lateral movements of agents between lanes (e.g., in and out of a reserved corridor).

Implementations of the subject matter described in this specification can be provisioned with or within vehicle-related systems such as those disclosed in commonly assigned U.S. application Ser. No. 17/210,099, filed on Mar. 23, 2021, and entitled Road Element Sensors and Identifiers, and commonly assigned U.S. application Ser. No. 17/476,800, filed on Sep. 16, 2021, and entitled Intelligent Entry and Egress for Dedicated Lane, each of which is expressly incorporated herein by reference in the entirety for all purpose.

FIG. 1 is a block diagram that illustrates an example of a system 100 that includes virtual barriers for a reserved corridor. The system 100 is deployed upon a road 101 on which vehicles 106-1 through 106-N travel. The system 100 includes a sensor subsystem 120 that includes a plurality of sensors 110-1 through 110-N. The system 100 illustrates three sensors and five vehicles, but there may be more or less sensors and more or less vehicles in other configurations. The road 101 is shown in system 100 with multiple lanes in a single direction. The road 105 may alternatively or additionally include a greater number of lanes having vehicles travel in the same direction as well as more than one lane of vehicles traveling in opposing directions.

The sensors 110-1 to 110-N (e.g., collectively, "sensors 110") can acquire sensor data 122 regarding a particular agent (e.g., a vehicle) moving on the road 101 in a particular direction. The system 100 can generate and monitor sensor data 122 that can not only describe the vehicle but can also illustrate by way of a representation of the vehicle in a lane, the speed of that vehicle, speed headway of the vehicle, and the relationship of that vehicle to other vehicles on a per frame basis. Moreover, the system 100 can generate and monitor sensor data in a similar manner for multiple vehicles. Examples of the agents that the system 100 can detect and identify can include a vehicle, such as a car, a semi-truck, a motorcyclist, a bus, and even a bicyclist. The system 100 can also identify a person that is moving along the road 101, such as along the sidewalk adjacent to the road or crossing the street. The system 100 can identify other objects that present itself on the road 101, such as a pet or an obstruction that may impede the flow of traffic.

The sensors 110 can include a variety of software and hardware devices that monitor objects on road 101. For example, the sensors 110 can include a LIDAR system, a video camera, a radar system, a Bluetooth system, and a Wi-Fi system to name a few examples. A sensor can include a combination of varying sensor types. For example, sensor 110-1 can include a video camera and a radar system; sensor 110-2 can include a video camera and a radar system; and, sensor 110-N can include a video camera, a LIDAR system, and a Wi-Fi system. Other sensor combinations are also possible.

A sensor can detect and track objects on the road 101 through its field of view. Each sensor can have a field of view set by the system 100. For example, if sensor 110-1 corresponds to a video camera, the field of view of the video camera can be based on the type of lens used (e.g., wide angle, normal view, and telephoto), and the depth of the camera field (e.g., 20 meters, 30 meters, and 60 meters). Other parameters for each sensor in system 100 can also be set. For example, if the sensor 110-2 corresponds to a LIDAR system, the parameters required for use would include the point density (e.g., a distribution of the point cloud), field of view (e.g., angle in which the LIDAR sensor can view), and line overlap (e.g., a measure to be applied that affects ground coverage). Other parameters for each of the sensors are also possible.

The field of view of each sensor becomes important because the system 100 can be designed in a variety of ways to enhance monitoring of agents on the road 101. For example, the system 100 can be configured to overlap fields of view of adjacent sensors 110 to ensure continuity for viewing the road 101 in its entirety. Additionally, overlapping field of view regions may facilitate monitoring areas where agents enter the road 101 through vehicle on-ramps or exit the road 101 through vehicle off-ramps. In some examples, system 100 can be configured to overlap the fields of view of adjacent sensors 110 but rather, juxtapose the fields of view of adjacent sensors 110 to ensure the widest coverage of the road 101. In this manner, the system 100 can monitor and track more vehicles at a time.

In addition, each sensor can include memory and processing components for monitoring the agents on the road 101. For example, each sensor can include memory for storing data that identifies and tracks the vehicles identified in the order the vehicles appear to a sensor. The processing components can include, for example, video processing, sensor processing, transmission, and receive capabilities. Each of the sensors can also communicate with one another over the network 118. The network 118 may include a Wi-Fi network, a cellular network, a Bluetooth network, an Ethernet network, or some other communicative medium. The sensors 110 can communicate with other subsystems of the system 100 over the network 118. For example, the sensors 110 can send the sensor data 122 to a management subsystem 116 over the network 118.

The management subsystem 116 can be implemented in one or more computers and one or more databases 126 located at the road 101, located remotely from the road over a network, or a combination of both. The management subsystem 116 can store data that represents the sensors 110 in the system 100. For example, the management subsystem 116 can store data that represents the sensors 110 that are available to be used for monitoring. The data can indicate which sensors 110 are active, which sensors 110 are inactive, the type of data recorded by each sensor, and data representing the fields of view of each sensor. The management subsystem 116 can store data identifying each of the sensors 110, such as IP addresses, MAC addresses, and preferred forms of communication to each particular sensor. The data can also indicate the relative positions of the sensors 110 in relation to one another.

The system 100 (e.g., the management subsystem 116) can generate a roadway configuration of the road 101. The roadway configuration can include a configuration status of the road 101. For example, the road way configuration 128 can include a reserved corridor (e.g., one or more dedicated lanes 102) and one or more general-purpose lanes 104. The reserved corridor can include one or more dedicated lanes that are dedicated for particular types of agents (e.g., autonomous vehicles, semi-autonomous vehicles, buses, etc.) during a specified period of time. The dedicated lane 102 can correspond to a lane that can be used by agents with special access following one or more conditions or criteria set by the system 100. The general-purpose lane 104 can correspond to a lane that is driven on by the public without any restrictions or tolls. For example, the general-purpose lane 104 can include a lane that a driver can drive freely towards their destination. In some cases, the general-purpose lane 104 can be used by all types of agents. In some cases, the general-purpose lane 104 can be used by agents that are different from the particular types of agents for the dedicated lane 102. The system 100 can store the roadway configuration 128 in a database 126, along with other information of the environment, such as a map 130 of the environment.

The system 100 (e.g., a barrier deployment subsystem 114) can create the reserved corridor by deploying road barriers 108-1 through 108-N on the road 101. The road barriers 108-1 to 108-N (e.g., collectively, "barriers 108") can separate the reserved corridor from other lanes. For example, the barriers 108 can separate the dedicated lane 102 from the general-purpose lane 104.

Instead of using physical road barriers, which can be challenging for the system 100 to safely and efficiently deploy and remove without significant impact to traffic, the system 100 uses virtual barriers (e.g., indicated using dotted lines for the road barriers 108-1 through 108-N). The system 100 can generate a roadway configuration 128 that includes the virtual barriers 108 that separates the reserved corridor and the general-purpose lane. The system can store the roadway configuration 128 that includes the virtual barriers 108 in the database 126.

The system 100 can send data indicating the virtual barriers 108 to agents on the road 101 (e.g., both autonomous or semi-autonomous vehicles and non-autonomous vehicles operated by human drivers). That is, the system 100 can create the reserved corridor for particular vehicles by sending data indicating a presence and location of respective virtual barriers 108 relative to the vehicles on the road 101. The system 100 can send or share the data indicating the virtual barriers 108 in a variety of formats, including: data exchanges, shared maps, short range RF communications, digital signs, visual cues, etc.

The variety of format of the data indicating the virtual barriers can be compatible with many potential ways of consumption of the data. For example, the data indicating the virtual barriers can be in the format of shared maps, and a vehicle can receive the shared maps and can store the shared maps in the high-definition maps on board the vehicle. As another example, the data indicating the virtual barriers can be in the format of a digital sign, and a camera installed on a vehicle can capture and analyze an image of the digital sign and can use the data indicating the virtual barriers in its planning system when planning a route for the vehicle.

After receiving the data indicating the virtual barriers 108, the agent (e.g., an autonomous vehicle, a semi-autonomous vehicle, or a human driver) can interpret the data and perform actions or reactions. In particular, after receiving data indicating the virtual barriers 108, ideally, the vehicles on the roadway should not cross the virtual barriers 108 as if the virtual barriers are physical road barriers.

For example, an autonomous vehicle 106-3 can save the data indicating the virtual barriers 108 in the on-board system of the autonomous vehicle. For example, the autonomous vehicle can store the data indicating the virtual barriers in the on-board high-definition maps or can incorporate the data into the on-board path/route planning system. The autonomous vehicle 106-3 should perceive the virtual barriers 108 as virtual objects that the autonomous vehicle is not allowed to cross. Thus, the autonomous vehicle 106-3 should not perform a lateral movement from the dedicated lane 102 towards the general-purpose lane 104. As another example, a human driven vehicle 106-1 can receive the data indicating the virtual barriers 108 and can have on-board technologies that can provide in-vehicle messages to a driver of the vehicle 106-1. Thus, the driver should not drive the vehicle 106-1 to move from the general-purpose lane 104 towards the dedicated lane 102.

After the system 100 has generated and deployed the roadway configuration 128 to the road 101, the system 100 can monitor aspects and characteristics of the vehicles in the configured road 101 based on sensor data 122 generated by the sensors 110. In some implementations, the management subsystem 116 can receive sensor data 122 from the sensor subsystem 120 that includes the sensors 110. The sensor data 122 can represent actions of the agents navigating on the road 101 that includes the general-purpose lane 104 and the dedicated lane 102, divided by the virtual barriers 108. The management subsystem 116 can process the sensor data 122 and can determine a predicted behavior of an agent on the road 101 that is represented by the sensor data 122. If the management subsystem 116 determines that the predicted behavior of an agent is likely abnormal or is likely dangerous to other road users, the management subsystem 116 can send a signal based on the predicted behavior. More details of predicting a lateral movement of an agent crossing the virtual barriers 108 are described below in connection with FIG. 2.

In some implementations, the system 100 can include a display subsystem 124 and the system 100 can send a signal based on the predicted behavior of an agent through the display subsystem 124. The display subsystem 124 can include one or more markings, a display signage, or a combination of both. The display subsystem 124 can include marking and display signage 112 on either side of the road, on both sides of the road, in the middle of the road, or a combination of these. For example, the display subsystem 124 can illuminate a particular light on a signal indicator, or provide a message to a display screen, based on the predicted abnormal behavior.

Figure 2:
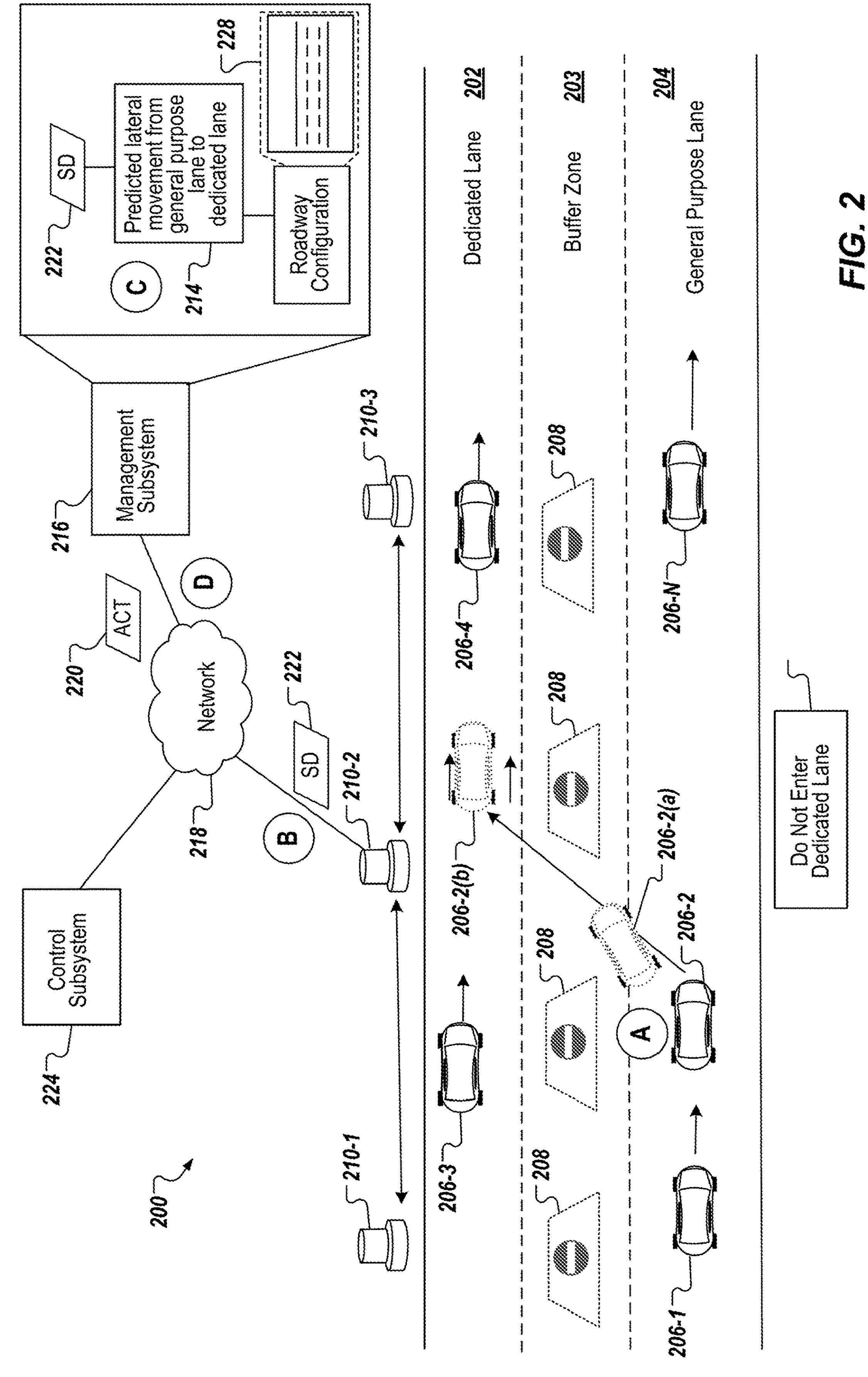
FIG. 2 is a block diagram that illustrates an example of a system that predicts and prevents lateral movements crossing virtual barriers.

FIG. 2 is a block diagram that illustrates an example of a system 200 that predicts and prevents lateral movements crossing virtual barriers. The system 200 can include all or some of the components of the system 100 in FIG. 1. The system 200 includes sensors 210-1 through 210-3 that are located on a roadway. The sensors 210-1 to 210-3 (e.g., collectively, "sensors 210") can acquire sensor data 222 regarding a particular agent (e.g., a vehicle) moving on the road in a particular direction.

The system 200 can generate and deploy a roadway configuration 228. The roadway configuration can include virtual barriers 208 that separate the road into a dedicated lane 202 and a general-purpose lane 204. The system 200 can be configured to allow some vehicles to use the dedicated lane 202. For example, autonomous and semi-autonomous vehicles (e.g., the vehicle 206-3 and the vehicle 206-4) can use the dedicated lane 202. Other vehicles can use the general-purpose lane 204. For example, non-autonomous vehicles or human-driven vehicles (e.g., the vehicles 206-1, 206-2, and 206-N) can use the general-purpose lane. Thus, the system can increase the safety and throughput by using a reserved corridor (e.g., the dedicated lane 202) dedicated for particular types of agents during a specific period of time.

Ideally, the vehicles 206-1 through 206-N should perceive the virtual barriers 208 as physical barriers that the vehicles are not allowed to cross. However, disengagement of autonomous vehicles or human drivers who operate non-autonomous vehicles may forget or ignore the virtual barriers sometimes. Vehicles may make lateral movements across the virtual barriers, which may slow down the traffic or even cause safety issues.

The system 200 can predict and prevent lateral movements of agents between lanes separated by the virtual barriers (e.g., in and out of a reserved corridor). FIG. 2 illustrates various operations in stages (A) through (D) performed by the system 200 to predict and prevent lateral movements crossing virtual barriers, which can be performed in the sequence indicated or another sequence.

During stage (A), the sensors 210 currently deployed at the roadway can generate sensor data 222 that represents a lateral movement of a vehicle. For example, a vehicle 206-2 that should only travel in the general-purpose lane 205 may make a lateral movement crossing the virtual barriers 208 and towards the dedicated lane 202. In some cases, the vehicle can be a human-driven vehicle that is not allowed to use the dedicated lane 202. In some cases, the vehicle can be an autonomous vehicle that can only enter the dedicated lane 202 during a transition segment of the road that does not have barriers.

One or more sensors 210 can capture the sensor data 222 that represents the lateral movement of the vehicle 206-2. For example, a single sensor 210-2 can capture a video or an image representative of the lateral movement of the vehicle. As another example, the sensor 210-1 can generate first sensor data representative of the beginning of the lateral movement and the sensor 210-2 can generate second sensor data representative of the lateral movement after the vehicle 206-2 has left the general-purpose lane 204.

The sensor data 222 can include different types of data depending on the types of the sensors 210. For example, the sensor data 222 can include one or more frames of images, one or more videos, one or more point clouds, one or more sound recordings, or a combination of these. The lateral movement of the agent represented by the sensor data 222 can include at least one of merging, weaving, and cutting-in movements of the agent. For example, a vehicle may continuously move in and out of the reserved corridor and the sensor data 222 can represent this abnormal behavior.

During stage (B), the sensors 210 can send the sensor data 222 to a management subsystem 216. The management subsystem 216 can be the management subsystem 116 described in FIG. 1. The management subsystem 216 can be positioned locally near the roadway or can be at a remote location away from the roadway. The sensors 210 can send the sensor data 222 to a management subsystem 216 over a network 218. The network 218 can be the network 118 described in FIG. 1. In some implementations, each sensor can send its respective sensor data to the management subsystem 216. In some implementations, each sensor can send its respective sensor data to a particular sensor (e.g., the sensor 210-2) that is connected to the network 218, and the particular sensor can aggregate the received sensor data and can send the aggregated sensor data to the management subsystem 218 through the network.

During stage (C), the management subsystem 216 can predict, from the sensor data 222, lateral movement of the vehicle crossing the virtual barriers 208. In some implementations, the management subsystem 216 can generate a predicted trajectory of the vehicle and the predicted trajectory can include a plurality of predicted future locations of the vehicle. In some implementations, the management subsystem 216 can generate the predicted lateral movement 214 using the sensor data 222 and the road configuration 228. The management subsystem 216 can compare the predicted trajectory of the vehicle with the roadway configuration 228. Based on comparing the predicted trajectory and the roadway configuration, the management subsystem 216 can predict that the vehicle 206-2 is moving from the general-purpose lane 204 to the dedicated lane 202.

For example, the road configuration 228 can include information of the virtual barriers 208 that separates the dedicated lane 202 and the general-purpose lane 204. The sensor data 222 can include an image representative of the movement of the vehicle 206-2 from the general-purpose lane 204 towards the dedicated lane 202. Thus, based on the sensor data 222 and the roadway configuration 228, the management subsystem 216 can predict a likely lane changing movement of the vehicle 206-2.

During stage (D), the management subsystem 216 can take an action 220 to prevent lateral movement. In some implementations, the system 200 can communicate the predicted lateral movement of the vehicle to vehicle through a variety of means. For example, the system 200 can send a warning message to a vehicle, such as "You are about to cross a barrier!", and the warning message can be interpreted by a computer system of the autonomous vehicle 206-2 or can be displayed to a driver of the vehicle 206-2. Alternatively or in combination, the system 200 can turn on a sign or a light installed along the roadway to communicate with the vehicle. For example, the system 200 can display a message "Do Note Enter Dedicated Lane" on a display screen 212 near the vehicle 206-2.

In some implementations, the roadway can include a buffer zone 203 (e.g., 3-6 feet buffer) between a reserved corridor for autonomous or semi-autonomous vehicles and a general-purpose lane to provide sufficient time for the sensing, prediction, communication and vehicle actuation steps. For example, the system 200 can send a warning message "Do Note Enter Dedicated Lane" to the vehicle 206-2 when the vehicle begins entering the buffer zone 203 and is at a location 206-2 (*a*). Thus, before the vehicle enters the dedicated lane 202 and impacts the traffic in the dedicated lane 202, the system 200 can send a signal to the vehicle 206-2 to prevent the vehicle from completing the lateral movement and to encourage the vehicle to return back to the general-purpose lane 204.

In some implementations, the system 200 can identify a vehicle that has made the lateral movement crossing the virtual barriers 208. The system 200 can institute retroactive measures to prevent future violations. For example, based on the sensor data 222, the system 200 can determine that the vehicle 206-2 has already traveled to the dedicated lane 202 because the sensor data 222 indicates that the vehicle is at location 206-2 (*b*). The system 200 can send additional warning messages to the vehicle 206-2 and the warning messages can help prevent the vehicle from making lateral movements in the future.

In some implementations, the system 200 can communicate the predicted lateral movement 214 to a subsystem (e.g., a control subsystem 224, the management subsystem 216, or a combination of both) that controls the operation of the roadway. The subsystem can take the predicted lateral movement 214 as input, as well as other road status information, and can determine an operation of the roadway. For example, after determining that an erratic vehicle 206-2 is weaving in and out of a reserved corridor, the control subsystem 224 can determine to remove the reserved corridor (e.g., by signaling off the virtual barriers 208) temporarily for improved safety at the cost of a reduced traffic throughput.

The system 200 is an example of a system implemented as computer programs on one or more computers in one or more locations, in which the systems, components, and techniques described in this specification are implemented. The system 200 may include sensors, computers, mobile communication devices, and other devices that can send and receive data over a network. The network 218, such as a local area network ("LAN"), wide area network ("WAN"), the Internet, or a combination thereof, connects the sensors 210, the management subsystem 216, and the control subsystem 224. The system 200 may use a single computer or multiple computers operating in conjunction with one another, including, for example, a set of remote computers deployed as a cloud computing service.

The computer system 200 can include several different functional components, including a management subsystem, a control subsystem, a display subsystem, a barrier deployment subsystem, and a sensor subsystem. The management subsystem, the control subsystem, the display subsystem, the barrier deployment subsystem, or the sensor subsystem, or a combination of these, can include one or more data processing apparatuses, can be implemented in code, or a combination of both. For instance, each of the management subsystem, the control subsystem, the display subsystem, the barrier deployment subsystem, and the sensor subsystem can include one or more data processors and instructions that cause the one or more data processors to perform the operations discussed herein.

The various functional components of the system 200 may be installed on one or more computers as separate functional components or as different modules of the same functional component. For example, the management subsystem, the control subsystem, the display subsystem, the barrier deployment subsystem, and the sensor subsystem of the system 200 can be implemented as computer programs installed on one or more computers in one or more locations that are coupled to each through a network. In cloud-based systems for example, these components can be implemented by individual computing nodes of a distributed computing system.

Figure 3:
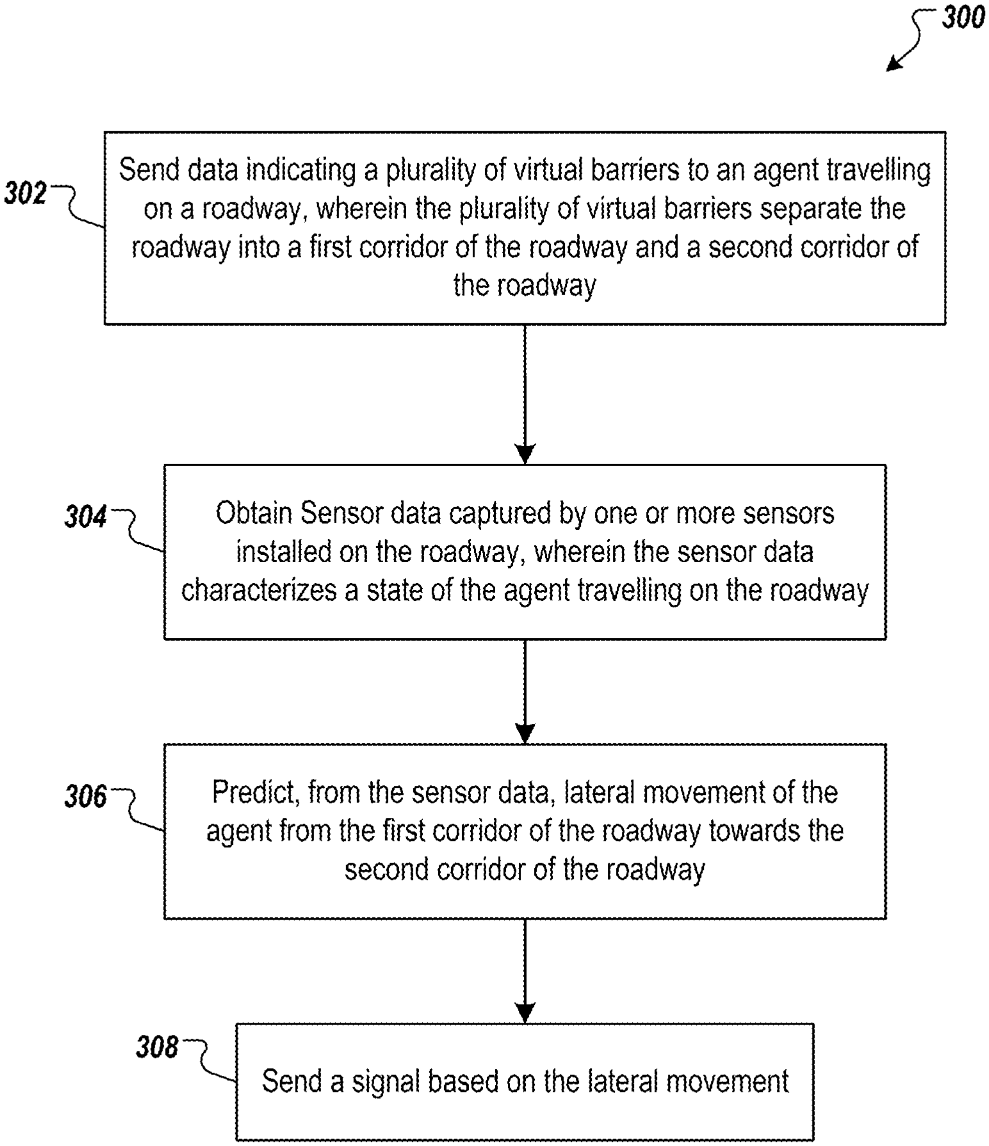
FIG. 3 is a flow diagram illustrating an example of a process for predicting and preventing lateral movements crossing virtual barriers.

FIG. 3 is a flow diagram illustrating an example of a process 300 for predicting and preventing lateral movements crossing virtual barriers. For example, the process 300 can be performed by the system 100, the system 200, the management subsystem 116 or 216, or a combination of these.

The system sends data indicating a plurality of virtual barriers to an agent traveling on a roadway (302). The plurality of virtual barriers can separate the roadway into a first corridor of the roadway and a second corridor of the roadway. For example, the system can send or share the data indicating the virtual barriers in a variety of formats, including: data exchanges, shared maps, short range RF communications, digital signs, visual cues, etc.

In some implementations, the agent can be a vehicle (e.g., an autonomous vehicle, a semi-autonomous vehicle, or a human driver) traveling on the roadway. In some implementations, after receiving the data indicating the virtual barriers, the agent can interpret the data and perform actions or reactions. For example, an autonomous vehicle can receive the data indicating the virtual barriers and can store the data indicating the virtual barriers in a dynamic road map that is used by the autonomous vehicle to make autonomous driving decisions. As another example, a semi-autonomous vehicle can receive the data indicating the virtual barriers and can have on-board technologies that can provide in-vehicle messages to the driver.

In some implementations, the first corridor and the second corridor can be separated by a plurality of virtual barriers that do not physically exist, and vehicles on the roadway are not allowed to move between the first corridor and the second corridor. For example, the first corridor can be a general-purpose lane that non-autonomous vehicles operated by human drivers can use and the second corridor can be a reserved corridor for autonomous or semi-autonomous vehicles (e.g., autonomous trucks, autonomous buses, and autonomous private vehicles). Vehicles operated by human drivers traveling on the general-purpose lane are not allowed to enter the reserved corridor, and autonomous or semi-autonomous vehicles should not move from the reserved corridor to the general-purpose lane.

The system obtains sensor data captured by one or more sensors installed on the roadway (304). The sensor data can characterize a state of the agent traveling on the roadway. The one or more sensors can include, for example and without limitation, a microphone which senses pressure waves, a camera sensor which senses visual light, a hyper-spectrum camera sensor which senses light that is beyond visual light spectrum, a LIDAR sensor, a radar sensor, and so on. In some implementations, the one or more sensors can include an array of lasers (e.g., a laser curtain). The array of lasers can obtain sensor data representative of lateral movements of vehicles. The one or more sensors can generate sensor data representative of a road state of the roadway. The road state of the roadway includes sub-states of one or more agents traveling on or within proximity of the roadway, sub-states of the road infrastructure, and sub-states of the environment, and so on.

Example agents can include, without limitation, a car, a truck, a pedestrian, a cyclist, etc. For example, the agent can be a vehicle (e.g., autonomous vehicle, semi-autonomous vehicle, or a non-autonomous vehicle) traveling on the roadway. The state of an agent (e.g., a vehicle) can be defined as the location, direction, velocity, acceleration, size of the agent, and some state associated with the agent (e.g., a kinetic model of the motion of the agent).

The system predicts, from the sensor data, lateral movement of the agent from the first corridor of the roadway towards the second corridor of the roadway (306). The system can detect, from the sensor data, lateral movement of the agent. The lateral movement of the agent can be an inter lane movement, such as merging, weaving, and cutting-in movements. The system can determine the lateral movement of a vehicle at a current time and/or can predict a possible lateral movement of the vehicle at a future time. For example, the system can detect that a car's left turn light is flashing, and the car is speeding up and is having a lateral movement towards the left. Based on this, the system can predict that the car is going to merge to the left lane.

In some implementations, the system can detect lateral movements of an agent over a period of time from sensor data captured by multiple sensors installed over a long distance on the roadway. Instead of only observing nearby vehicles over a short period of time as performed by a perception system of an autonomous vehicle, the system can detect lateral movements of a vehicle over a longer period of time by taking advantage of the multiple sensors installed over a distance on the roadway. For example, the system can detect that a vehicle frequently weaves between multiple lanes over a period of time (e.g., changing lanes N times over 10 minutes, and N is larger than a threshold value, such as 5 times).

The system can predict, from the lateral movement of the agent, that the agent is going to move from the first corridor of the roadway towards the second corridor of the roadway. For example, a vehicle can be traveling on the first corridor and is heading towards the direction of the second corridor. The system can predict that the agent is going to move from the first corridor to the second corridor.

In some implementations, the system can predict lateral dynamics of moving vehicles using roadside sensors in real time or near real time. For example, the system can recognize the disengagements of an autonomous vehicle based on the lateral movement of the autonomous vehicle between the lanes.

In some implementations, the agent can be an autonomous vehicle or semi-autonomous vehicle. The system can predict from the lateral movement of the agent, that the agent is going to move from a reserved corridor for autonomous or semi-autonomous vehicles towards a general-purpose lane. In some implementations, the agent can be a vehicle operated by a human driver. For example, the system can provide a human driver with information related to the rules of the road, e.g., the plurality of virtual barriers that creates the first corridor and the second corridor. The system can predict, from the lateral movement of the agent, that the agent is going to move from a general-purpose lane towards a reserved corridor for autonomous or semi-autonomous vehicles. For example, a vehicle can merge into the reserved corridor, drive for a while, and merge out of the reserved corridor. The system can recognize the erratic and unpredictable driving behavior of the vehicle.

In some implementations, the system can classify the agent into several categories. For example, the system can determine whether the autonomous driving system of an autonomous vehicle is engaged, and can detect disengagements of the autonomous vehicle (e.g., unpredictable or erratic behavior). As another example, the system can classify a vehicle driven by a human driver as driven by a "good driver," "bad driver," "erratic driver", and so on.

The system sends a signal based on the lateral movement (308). Based on the predicted lateral movement, the system can perform actions to prevent a future lateral movement and/or reduce the frequency of undesired lateral movements between the first corridor and the second corridor (e.g., crossing lanes separated by the virtual barriers). Therefore, the system can reduce or eliminate disengagement of autonomous/semi-autonomous vehicles from the lateral movement between lanes. The virtual barriers can effectively separate the lanes and can be a substitute for physical barriers which would be required otherwise to prevent disengagements of vehicles.

In some implementations, the system can communicate the predicted lateral movement of an agent to the agent through a variety of means. The system can include a module (e.g., a software module such as an APP) that is deployed on the agent that is making the lateral movement, and the software module can receive a signal or a message indicating the predicted lateral movement of the agent. The system can include a module (e.g., a software module) on the side of the roadway, and the module can communicate with a vehicle that is traveling on the roadway.

In some implementations, the system can send the signal of the lateral movement to the agent to prevent the agent from moving to the second corridor of the roadway. For example, the system can send a message to the vehicle, such as "You are about to cross a barrier!" As another example, the system can send a message to the vehicle regarding potential penalties if the vehicle continues to act erratically (e.g., an increase to the vehicle insurance premium, or an amount of fine to penalize crossing the virtual barriers).

In some implementations, the system can send the signal to a display device installed on the roadway (e.g., an electronic sign, a flashlight, or a display screen). The system can display the signal to the agent to prevent the agent from moving to the second corridor of the roadway. For example, the system can turn on a sign or a light installed along the roadway to communicate with the vehicle. The sign or the display can indicate that virtual barriers exist between the first and the second corridors. The sign or the display can warn the vehicle to not cross the virtual barriers.

In some implementations, the system can send the signal of the lateral movement to another agent (e.g., another vehicle) traveling on the roadway. In some implementations, the system can broadcast the signal to a plurality of agents traveling on the roadway. After receiving the signal, the other agent can respond to the previously unpredictable or erratic behavior of the agent to enable safe and controlled inter lane movements (e.g., merges, weavings, or cut-ins). For example, after detecting an erratic non-autonomous vehicle that is trying to enter the reserved corridor for autonomous vehicles, the system can send a signal to an autonomous vehicle currently traveling on the reserved corridor indicating that the erratic non-autonomous vehicle is about to enter the reserved corridor. After receiving the signal, the autonomous vehicle can yield to the erratic non-autonomous vehicle such that the erratic non-autonomous vehicle can safely merge into the reserved corridor.

In some implementations, the roadway can include a buffer zone between the first corridor and the second corridor. The roadway can include a buffer zone (e.g., 3-6 feet buffer) between a reserved corridor for autonomous or semi-autonomous vehicles and a general-purpose lane to provide sufficient time for the sensing, prediction, communication and vehicle actuation steps. In some implementations, the system can identify an agent that violates the roadway rule created by the virtual barriers, e.g., an agent has made the lateral movement crossing the virtual barriers. The system can institute retroactive measures to prevent future violations. For example, the system can send additional warning messages to the agent and the warning messages can help prevent the agent from making lateral movements in the future.

In some implementations, the system can send the signal of the lateral movement to a control system of the roadway. The system can communicate the predicted lateral movement of an agent to a control system that controls the operation of the roadway. The control system can take the predicted lateral movements as input, as well as other road status information, and can determine an operation of the roadway. For example, after determining that an erratic vehicle is weaving in and out of a reserved corridor, the control system can determine to remove the reserved corridor (e.g., by signaling off the virtual barriers) temporarily for improved safety at the cost of a reduced traffic throughput.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium) for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are described in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the claims.

What is claimed is:

1. A computer-implemented method for managing movement of vehicles along roadways having virtual barriers, the method comprising:

sending data indicating a plurality of virtual barriers to an agent traveling on a roadway, wherein the plurality of virtual barriers separate the roadway into a first corridor of the roadway, a second corridor of the roadway, and a buffer zone between the first corridor and the second corridor, the first corridor running parallel to the second corridor on opposite sides of the plurality of virtual barriers, wherein the second corridor is a reserved corridor dedicated for agents of a target vehicle type, the target vehicle type comprising one of autonomous, semi-autonomous, or human operated;

obtaining sensor data captured by one or more sensors installed on the roadway, wherein the sensor data characterizes a state of the agent traveling on the roadway in a direction within the first corridor;

determining, from the sensor data, that the agent is making a lateral movement from the first corridor of the roadway into the buffer zone and towards the second corridor of the roadway to travel in the direction within the second corridor;

determining a type of the agent, the type comprising one of autonomous, semi-autonomous, or human operated;

determining that the type of the agent is different from the target vehicle type; and in response to (i) determining that the agent is making the lateral movement from the first corridor into the buffer zone and towards the second corridor, and (ii) determining that the type of the agent is different from the target vehicle type, before the agent enters the second corridor, sending a signal to one or more devices to cause controlling movement of the agent to move away from the second corridor of the roadway or to return back to the first corridor of the roadway, wherein the signal encoding response data that is processable by the one or more devices, the response data being dependent on the type of the agent.

2. The method of claim 1, wherein the first corridor and the second corridor are separated by the plurality of virtual barriers that do not physically exist, wherein vehicles on the roadway are not allowed to move between the first corridor and the second corridor.

3. The method of claim 1, wherein the lateral movement of the agent comprises at least one of merging, weaving, or cutting-in movements of the agent.

4. The method of claim 1, wherein the agent is a vehicle traveling on the roadway.

5. The method of claim 1, wherein the agent is one of an autonomous vehicle or a semi-autonomous vehicle, and determining, from the sensor data, that the agent is making the lateral movement from the first corridor of the roadway into the buffer zone and towards the second corridor of the roadway comprises:

determining, from the sensor data, that the agent is going to move from the reserved corridor for autonomous or semi-autonomous vehicles towards a general-purpose lane.

6. The method of claim 1, wherein the agent is a vehicle operated by a human driver, and determining, from the sensor data, that the agent is making the lateral movement of the agent from the first corridor of the roadway into the buffer zone and towards the second corridor of the roadway comprises:

determining, from the sensor data, that the agent is going to move from a general-purpose lane towards the reserved corridor for autonomous or semi-autonomous vehicles.

7. The method of claim 1, wherein sending the signal comprises:

sending the signal of the lateral movement to cause the controlling the movement of the agent to prevent the agent from moving to the second corridor of the roadway.

8. The method of claim 1, wherein sending the signal comprises:

sending the signal to a display device installed on the roadway; and displaying the signal to the agent to prevent the agent from moving to the second corridor of the roadway.

9. The method of claim 1, wherein sending the signal comprises:

sending the signal of the lateral movement to a control system of the roadway.

10. The method of claim 1, wherein sending the signal comprises:

sending the signal of the lateral movement to another agent traveling on the roadway.

11. A system comprising one or more computers and one or more storage devices on which are stored instructions that are operable, when executed by the one or more computers, to cause the one or more computers to perform operations for managing movement of vehicles along roadways having virtual barriers, the operations comprising:

sending data indicating a plurality of virtual barriers to an agent traveling on a roadway, wherein the plurality of virtual barriers separate the roadway into a first corridor of the roadway, a second corridor of the roadway, and a buffer zone between the first corridor and the second corridor, the first corridor running parallel to the second corridor on opposite sides of the plurality of virtual barriers, wherein the second corridor is a reserved corridor dedicated for agents of a target vehicle type, the target vehicle type comprising one of autonomous, semi-autonomous, or human operated;

obtaining sensor data captured by one or more sensors installed on the roadway, wherein the sensor data characterizes a state of the agent traveling on the roadway in a direction within the first corridor;

determining, from the sensor data, that the agent is making a lateral movement from the first corridor of the roadway into the buffer zone and towards the second corridor of the roadway to travel in the direction within the second corridor;

determining a type of the agent, the type comprising one of autonomous, semi-autonomous, or human operated;

determining that the type of the agent is different from the target vehicle type; and in response to (i) determining that the agent is making the lateral movement from the first corridor into the buffer zone and towards the second corridor, and (ii) determining that the type of the agent is different from the target vehicle type, before the agent enters the second corridor, sending a signal to one or more devices to cause controlling movement of the agent to move away from the second corridor of the roadway or to return back to the first corridor of the roadway, wherein the signal encoding response data that is processable by the one or more devices, the response data being dependent on the type of the agent.

12. The system of claim 11, wherein the first corridor and the second corridor are separated by the plurality of virtual barriers that do not physically exist, wherein vehicles on the roadway are not allowed to move between the first corridor and the second corridor.

13. The system of claim 11, wherein the lateral movement of the agent comprises at least one of merging, weaving, or cutting-in movements of the agent.

14. The system of claim 11, wherein the agent is one of an autonomous vehicle or a semi-autonomous vehicle, and determining, from the sensor data, that the agent is making the lateral movement from the first corridor of the roadway into the buffer zone and towards the second corridor of the roadway comprises:

determining, from the sensor data, that the agent is going to move from the reserved corridor for autonomous or semi-autonomous vehicles towards a general-purpose lane.

15. The system of claim 11, wherein the agent is a vehicle operated by a human driver, and determining, from the sensor data, that the agent is making the lateral movement of the agent from the first corridor of the roadway into the buffer zone and towards the second corridor of the roadway comprises:

determining, from the sensor data, that the agent is going to move from a general-purpose lane towards the reserved corridor for autonomous or semi-autonomous vehicles.

16. A non-transitory computer storage medium encoded with instructions that, when executed by one or more computers, cause the one or more computers to perform operations for managing movement of vehicles along roadways having virtual barriers, the operations comprising:

sending data indicating a plurality of virtual barriers to an agent traveling on a roadway, wherein the plurality of virtual barriers separate the roadway into a first corridor of the roadway, a second corridor of the roadway, and a buffer zone between the first corridor and the second corridor, the first corridor running parallel to the second corridor on opposite sides of the plurality of virtual barriers, wherein the second corridor is a reserved corridor dedicated for agents of a target vehicle type, the target vehicle type comprising one of autonomous, semi-autonomous, or human operated;

obtaining sensor data captured by one or more sensors installed on the roadway, wherein the sensor data characterizes a state of the agent traveling on the roadway in a direction within the first corridor;

determining, from the sensor data, that the agent is making a lateral movement from the first corridor of the roadway into the buffer zone and towards the second corridor of the roadway to travel in the direction within the second corridor;

determining a type of the agent, the type comprising one of autonomous, semi-autonomous, or human operated;

determining that the type of the agent is different from the target vehicle type; and in response to (i) determining that the agent is making the lateral movement from the first corridor into the buffer zone and towards the second corridor, and (ii) determining that the type of the agent is different from the target vehicle type, before the agent enters the second corridor, sending a signal to one or more devices to cause controlling movement of the agent to move away from the second corridor of the roadway or to return back to the first corridor of the roadway, wherein the signal encoding response data that is processable by the one or more devices, the response data being dependent on the type of the agent.

17. The non-transitory computer storage medium of claim 16, wherein the first corridor and the second corridor are separated by the plurality of virtual barriers that do not physically exist, wherein vehicles on the roadway are not allowed to move between the first corridor and the second corridor.

18. The non-transitory computer storage medium of claim 16, wherein the agent is one of an autonomous vehicle or a semi-autonomous vehicle, and determining, from the sensor data, that the agent is making the lateral movement from the first corridor of the roadway into the buffer zone and towards the second corridor of the roadway comprises:

determining, from the sensor data, that the agent is going to move from the reserved corridor for autonomous or semi-autonomous vehicles towards a general-purpose lane.

19. The non-transitory computer storage medium of claim 16, wherein the agent is a vehicle operated by a human driver, and determining, from the sensor data, that the agent is making the lateral movement of the agent from the first corridor of the roadway into the buffer zone and towards the second corridor of the roadway comprises:

determining, from the sensor data, that the agent is going to move from a general-purpose lane towards the reserved corridor for autonomous or semi-autonomous vehicles.

20. The non-transitory computer storage medium of claim 16, wherein the lateral movement of the agent comprises at least one of merging, weaving, or cutting-in movements of the agent.

* * * * *